(12) United States Patent
Convery

(10) Patent No.: US 9,656,270 B2
(45) Date of Patent: May 23, 2017

(54) APPARATUS FOR CLASSIFYING PARTICULATE MATERIAL

(71) Applicant: CDE Global Limited, Cookstown, County Tyrone (GB)

(72) Inventor: Anthony Convery, County Londonderry (GB)

(73) Assignee: CDE Global Limited, Cookstown, County Tyrone (GB)

(*) Notice: Subject to any disclaimer, the term of this patent is extended or adjusted under 35 U.S.C. 154(b) by 0 days.

(21) Appl. No.: 14/936,954

(22) Filed: Nov. 10, 2015

(65) Prior Publication Data
US 2016/0129453 A1    May 12, 2016

(30) Foreign Application Priority Data

Nov. 10, 2014    (GB) .................................. 1420006.7

(51) Int. Cl.
*B03B 5/62*    (2006.01)
*B01D 21/00*   (2006.01)

(52) U.S. Cl.
CPC .......... *B03B 5/623* (2013.01); *B01D 21/0003* (2013.01)

(58) Field of Classification Search
CPC .. B03B 5/62; B03B 5/623; B03B 5/66; B01D 21/0024
See application file for complete search history.

(56) References Cited

U.S. PATENT DOCUMENTS

| | | | | |
|---|---|---|---|---|
| 170,890 | A * | 12/1875 | Osterspey | B03B 5/623 209/158 |
| 907,387 | A * | 12/1908 | Merrill | B03B 5/623 209/160 |
| 982,583 | A * | 1/1911 | Flood | B03B 5/623 209/158 |
| 1,319,208 | A | 10/1919 | Cole | |
| 1,449,603 | A | 3/1923 | Hokanson | |
| 1,750,090 | A | 3/1930 | Chance et al. | |
| 2,418,821 | A * | 4/1947 | Coghill | B03B 5/623 209/158 |
| 2,679,934 | A * | 6/1954 | Remick | B03B 5/66 209/159 |
| 3,237,773 | A * | 3/1966 | Laakso | B03B 5/623 162/60 |
| 3,310,242 | A * | 3/1967 | Perkins | D21D 5/06 209/17 |

(Continued)

FOREIGN PATENT DOCUMENTS

DE    3928369    3/1991

*Primary Examiner* — Joseph C Rodriguez
(74) *Attorney, Agent, or Firm* — Gardner, Linn, Burkhart & Flory, LLP

(57) ABSTRACT

An apparatus for classifying particulate material includes at least one tank for receiving a feed slurry, a device for introducing water into a lower region of the at least one tank whereby water is caused to flow upwardly and through the feed slurry contained therein, whereby hydraulic separation takes place within the at least one tank with particles of lower settling velocity progressing upwardly and into a device for effecting discharge of an overflow fraction from the at least one tank, and particles of greater settling velocity progressing downwardly to a lower region of at least one tank, wherein the feed slurry is introduced into the at least one tank in an upwards direction.

18 Claims, 3 Drawing Sheets

(56) References Cited

U.S. PATENT DOCUMENTS

| | | | |
|---|---|---|---|
| 4,222,860 A * | 9/1980 | Park | B03B 5/623 |
| | | | 209/159 |
| 4,961,843 A * | 10/1990 | Lewis | B03B 5/623 |
| | | | 209/155 |
| 2005/0045535 A1 | 3/2005 | Fendley | |

* cited by examiner

APPARATUS FOR CLASSIFYING PARTICULATE MATERIAL

FIELD OF THE INVENTION

This invention relates to an apparatus for classifying particulate material.

BACKGROUND OF THE INVENTION

Classification may be defined as the separation of solid particles into two or more products according to their velocities when falling through a fluid medium, such as water. The velocity of the particles depends on their size, shape and density. Particles with a higher density and larger size will settle down quickly compared to particles with a lower density and smaller size.

Hydraulic classification is the separation of particles in a tank by specific gravity, utilizing the action of rising water currents to separate the particles into a light fraction and into a heavier fraction. Heavier and larger particles settle down and leave the vessel through an underflow outlet while lighter and finer particles leave the vessel with most of the water as the water overflows from an upper end of the vessel. Hydraulic classifiers are widely used in sand and glass industry.

A problem with hydraulic classification is that turbulence is generated in the tank as the slurry to be separated is introduced into the tank, typically under gravity. Such turbulence disturbs the flow pattern of particles within the tank and reduces the efficiency of the separation process.

SUMMARY OF THE INVENTION

The present invention provides an apparatus for classifying particulate material in a fluid medium, which reduces the effects of turbulence and thus exhibits increased efficiency of a particulate material separation process.

According to one form of the present invention there is provided apparatus for classifying particulate material comprising at least one tank for receiving a feed slurry, a device for introducing water into a lower region of the at least one tank whereby water is caused to flow upwardly and through the feed slurry contained therein, whereby hydraulic separation takes place within the at least one tank with particles of lower settling velocity progressing upwardly and into a device for effecting discharge of an overflow fraction from the at least one tank, and particles of greater settling velocity progressing downwardly to a lower region of at least one tank, wherein the feed slurry is introduced into the at least one tank in an upwards direction.

In one aspect, the device for introducing feed slurry into the at least one tank comprises at least one feed conduit or passage having an upwardly facing outlet portion opening into the at least one tank.

In another aspect the apparatus may comprise first and second tanks, water being introduced into a lower region of each of the first and second tanks whereby water is caused to flow upwardly and through the feed slurry contained in each of the first and second tanks, each tank being provided with device for effecting discharge of an overflow fraction therefrom, the device for introducing feed slurry into the second tank comprising at least one transfer passage for transferring material from the lower region of the first tank to the second tank, wherein an outlet region of the at least one transfer passage extends upwardly within the second tank such that feed slurry enters the second tank in an upwards direction.

In yet another aspect, the device for introducing water into the first and second tanks is adapted to create a pressure differential between the ends of the (or each) transfer passage to cause the feed slurry to flow through the at least one transfer passage from the first tank to the second tank, for example by causing the teeter bed in the first tank to be higher than the teeter bed in the second tank.

In still another aspect, the at least one transfer passage comprises an elongate pipe extending from the lower region of the first tank and into a central region of the second tank.

It is envisaged that at least one further tank may be provided downstream of the second tank, the feed slurry introducing device of the (or each of) at least one further tank comprising at least one further transfer passage extending from a lower region of an adjacent tank into the at least one further tank, wherein an outlet region of the at least one further transfer passage extends upwardly such that feed slurry enters the at least one further tank in an upwards direction.

In a further aspect, the second tank is arranged coaxially within the first tank. Preferably a lower end of the second tank extends below a lower end of the first tank.

Optionally, an outlet end of the at least one transfer passage is substantially aligned with a central axis of the second tank. Where there are more than one transfer passages extending between the first and second tanks the outlet ends of the transfer passages may be evenly spaced around the central axis of the second tank.

In still another aspect, an upper edge of the first tank may define an outlet weir, wherein the overflow fraction of the first tank passes into an annular collection area surrounding an upper region of the first tank. The collection area may include a drain outlet. The drain outlet may include a valve for controlling the flow therefrom.

Optionally, the at least one transfer passage is arranged to introduce the feed slurry into the second tank at a predetermined flow rate.

In a still further aspect, the device for introducing water into a lower region of the (or each) tank comprises one or more downwardly facing discharge pipes.

In yet another aspect, the device for introducing water into the first and second tanks comprises a first supply device, such as a first pump, for delivering water to one or more outlets in a lower region of the first tank and a second supply device, such as a second pump, for delivering water to one or more outlets in a lower region of the second tank, the first and second supply devices being independently controllable to independently vary the flow rate of water delivered to each of the first and second tanks from the respective outlets.

Optionally, sensors, such as pressure transducers, are provided for determining the height of the teeter bed in one or both of the first and second tanks.

In a still further aspect, the second tank is provided with at least one outlet in a lower region thereof for withdrawing an underflow fraction from the region. Preferably a control device is provided for controlling the flow rate of the underflow fraction through the outlet.

In another aspect, a peripheral upper edge of second tank defines an outlet weir, wherein the overflow fraction of the second tank passes into an annular collection area surrounding an upper region of the second tank. The annular collection area of the second tank may be provided with a drain outlet. When the second tank is located within the first tank, such drain outlet may extend through the first tank.

These and other objects, advantages and features of the invention will become apparent upon review of the following specification in conjunction with the drawings.

BRIEF DESCRIPTION OF THE DRAWINGS

A classification apparatus in accordance with an embodiment of the present invention will now be described, by way of example only, with reference to the accompanying drawings, in which.

DESCRIPTION OF THE PREFERRED EMBODIMENTS

Figure 1:
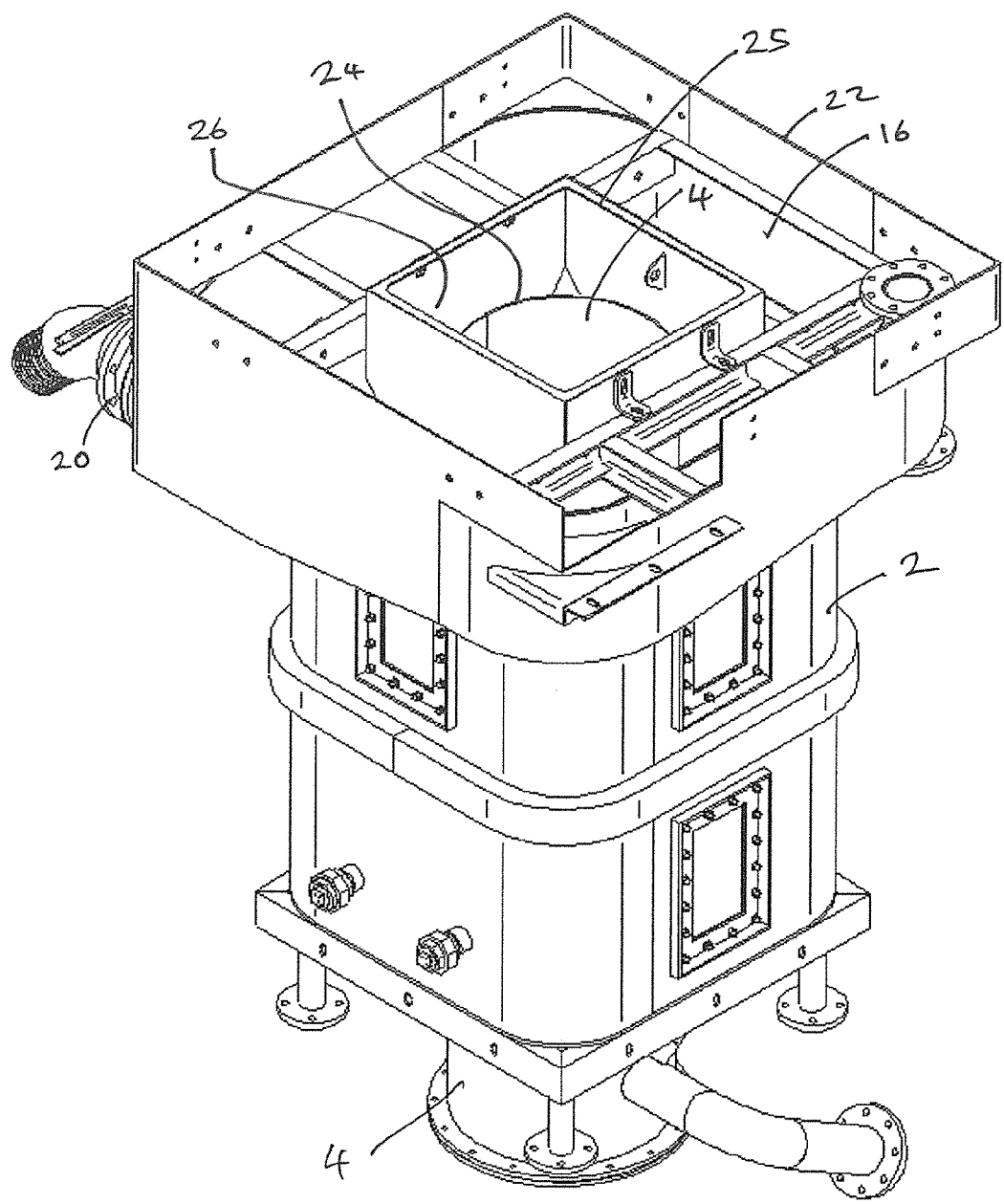
FIG. 1 is a perspective view of a classification apparatus according to an embodiment of the present invention.
Figure 2:
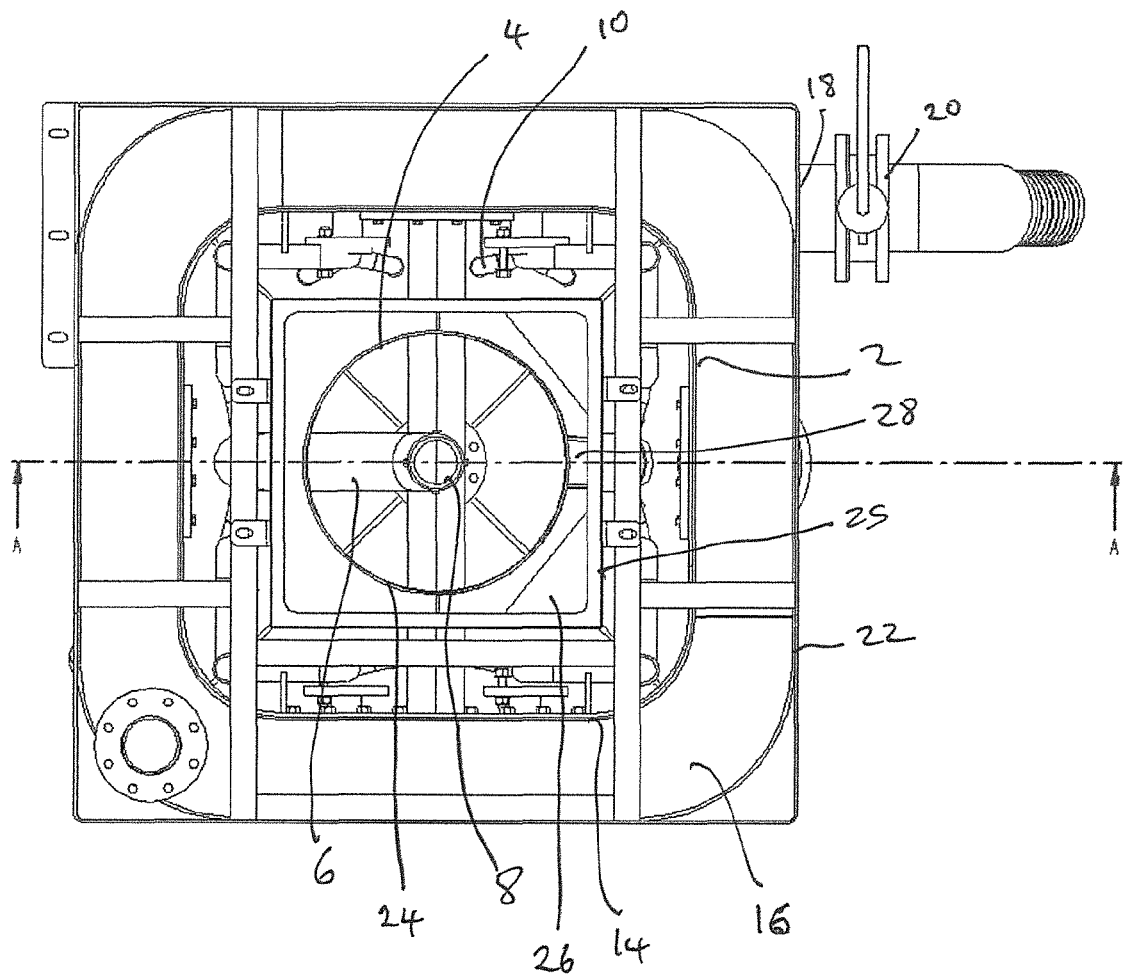
FIG. 2 is a plan view of the apparatus of FIGS. 1.

As illustrated in the drawings, a classification apparatus for classifying and separating sand or similar fine particulate material suspended in a fluid, such as water, for example in the form of a slurry, comprises first and second coaxially arranged classification tanks 2,4. The first (or outer) tank 2 comprises a vertically arranged tubular housing, having substantially square cross sectional outer wall (although it is envisaged that the first tank 2 may have a cylindrical section or other shape). The second (or inner) tank 4 comprises a vertically arranged substantially cylindrical outer wall located coaxially within the first or outer tank 2. The lower end of the second tank 4 extends below the lower end of the first tank 2. Again, the cross sectional shape of the second tank 4 may be other than cylindrical, for example square section.

A transfer passage 6 extends between the first and second tanks 2,4 allowing water, and particulate material entrained therein (for example in the form of a water/sand slurry), to pass between the first tank 2 and the second tank 4. The transfer passage 6 comprises a vertically arranged inlet section, extending downwardly into a lower region of the first tank 2, an inclined region extending through the side wall of the second tank 4 and a vertically arranged outlet region 8 extending upwardly and opening into a central or upper region of the second tank 4. Preferably the outlet region 8 of the transfer passage 6 is aligned with a central axis of the second tank 4 such that water and entrained material passes from the first tank 2 into the second tank 4 in an upwards direction with minimal turbulence. The height of an outlet end of the outlet region 8 of the transfer passage 6 may be adjustable, for example by forming the outlet region 8 from a telescopic section of pipe. A plurality of transfer passages may be provided, in which case the outlet regions of the transfer passages may be equally spaced around the central axis of the second tank.

Water outlets 10,12 are provided in a lower region of each of the first and second tanks 2,4 connected to a water supply whereby water is caused to flow upwardly within each tank 2,4 to overflow from an upper end of each tank 2,4 into respective first and second collection chambers 16,26 surrounding the upper end of each tank 2,4. The flow of water from the water outlets 10 in the first tank is controlled to be less than the flow of water form the water outlets 12 in the second tank such that the upward water velocity in the first tank is less than that of the second tank, such that the teeter bed in the first tank 2 is higher than the teeter bed in the second tank 4. This creates a pressure differential between the ends of the transfer passage 6, causing slurry to flow trough the transfer passage 6 from the first tank 2 to the second tank 4.

Figure 3:
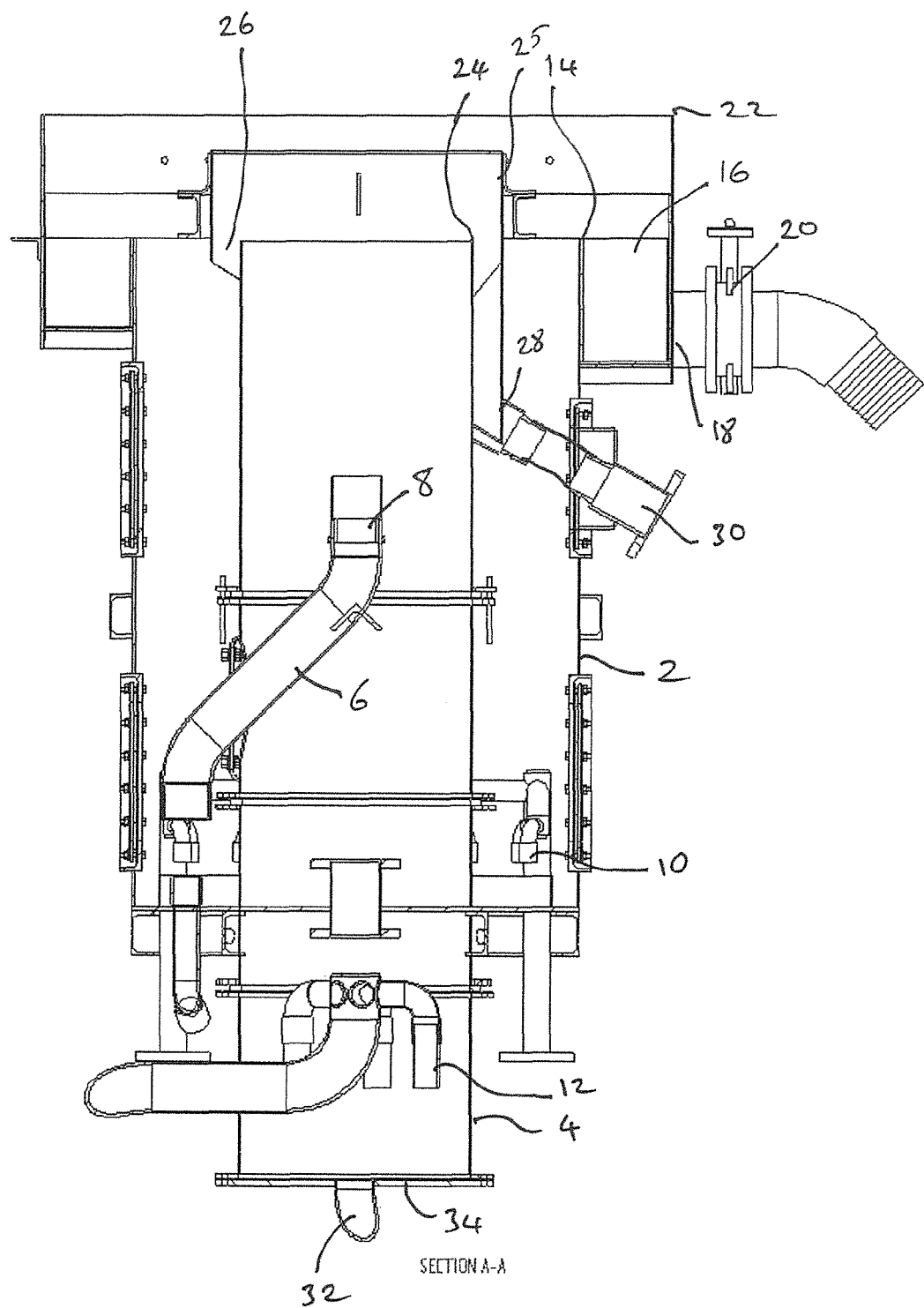
FIG. 3 is a longitudinal sectional view of the apparatus of FIG. 1 taken along line A-A of FIG. 2.

As shown in FIG. 3, the water outlets 10,12 in each tank may be arranged to face downwardly to prevent sand and other particulate material from settling into the water outlets 10,12 when the system is shut down.

An upper edge of the first tank 2 defines a peripheral overflow weir 14 over which water and fine entrained solids within the first tank 2 may overflow into an annular first collection chamber 16 surrounding an upper end of the first tank 2. A drain outlet 18 is provided in the first collection chamber 16. A gate valve or other flow control valve 20 may be provided for controlling the flow through the drain outlet 18 of the first collection chamber 16. As shown in FIG. 3, an upper edge 22 of the outer wall of the first collection chamber 16 is higher than the overflow weir 14 of the first tank 2.

Similarly an upper edge of the second tank 4 defines a peripheral overflow weir 24 over which water and entrained solids within the second tank 4 may overflow. A second collection chamber 26 having a peripheral outer wall 25 is provided around an upper end of the second tank 4, within the first tank 2, for receiving water and entrained material passing over the overflow weir 24 defined by the upper edge of the second tank 4. A drain outlet 28 is provided in a lower region of the second collection chamber 26 connected to a downwardly inclined drain passage 30 extending through the first tank 2 and passing through a side wall of the first tank 2 to drain the overflow from the second tank 4.

A drain outlet 32 is provided in a lower wall 34 of the second tank 4 for removing heavier material settling in a lower region of the second tank 4, as will be described in more detail below.

In use, a feed slurry is discharged into an upper region of the first tank 2, for example from a hydrocyclone, via suitable discharge outlets (not shown) while water is supplied to the water outlets 10 in the lower region of the first tank 2, such that water is caused to flow upwardly through the feed slurry within the first tank 2. Very fine particulate material (for example 1-100 μm) is carried in the upward flow of water in the first tank to pass over the overflow weir 14 defined by the upper edge of the outer wall of the first tank 2 and into the first collection chamber 16, from which it is removed as a first cut via the drain outlet 18 of the first collection chamber 16.

Due to the pressure differential between the ends of the transfer pipe, water and heavier entrained particulate material passes through the transfer pipe 6 from a lower region of the first tank 2 and is delivered into a central region of the second tank 4 through the outlet region 8 of the transfer pipe 6 in an upwards direction, avoiding the creation of turbulence within the second tank 4. At the same time water is supplied to the water outlets 12 in the lower region of the second tank 4, creating an upwards flow of water within the second tank 4. Heavier particulate material (for example 200 μm to 2 mm) falls against the flow of water under the action of gravity to settle in a lower region of the second tank 4. At the same time, lighter particulate material (for example 100 μm to 200 μm) is carried in the upward flow of water in the second tank 4 to pass over the overflow weir 24 defined by the upper edge of the outer wall of the second tank 4 to pass into the second collection chamber 26 surrounding an upper end of the second tank 4 to drain therefrom via the drain outlet 28 thereof as a second cut.

The height of the teeter bed in the second tank 4 may be controlled via a combination of the flow rate of water from the water outlets 12 and the flow rate through the drain outlet 32. Pressure transducers may be provided for determining the fluid pressure a predetermined heights in each of the first and second tanks, such date being fed to a controller, whereby the flow of water to the water outlets 10,12 and the flow of material through the drain outlet 28 may be controlled to control the height of the teeter bed and/or the bed depth of settled solids material in the second tank 4.

A control device may be provided for controlling the flow rate of material through the (or each) transfer passage 6. Such control device may include a valve within the (or each) transfer passage of a drain outlet in the first tank.

The heavier particulate material collected in the lower region of the second tank 4, defining a third cut, is removed from the second tank 4 via the drain outlet 32 in the lower end 34 of the second tank 4, for example under the control of a modulating pinch valve.

It will be appreciated that the invention is not limited to the embodiment(s) described herein, but can be amended or modified without departing from the scope of the present invention. For example, while the second tank is described as being co-axially arranged within the first tank, it is envisaged that the first and second tanks may be arranged side by side, the transfer passage extending between the first and second tanks as described above. It is also envisaged that one or more further tanks may be provided, connected in series with one another, respective transfer pipes being provided for passing material between adjacent tanks such that several cuts having different particle size may be provided.

In an alternative embodiment it is envisaged that a single tank may be provided, feed slurry being introduced into the single tank via one or more inlet pipes, the (or each) inlet having an outlet portion extending upwardly within the tank to deliver the feed slurry into the tank in an upwards direction. As with the previous embodiments, water is delivered into a lower region of the tank, whereby water is caused to flow upwardly and through the feed slurry contained therein, whereby hydraulic separation takes place within the at least one tank with particles of lower settling velocity progressing upwardly and into a device for effecting discharge of an overflow fraction from the at least one tank, and particles of greater settling velocity progressing downwardly to a lower region of at least one tank to be removed via a drain outlet. The flow rate of the water introduced into the tank is controlled to control the upward velocity of the water within the tank, controlling the cut point of the material in the underflow and overflow of the tank. The flow rate of feed slurry delivered into the tank via the one or more inlet pipes may be controlled as a function of the flow rate of water to minimise turbulence within the tank.

Changes and modifications to the specifically described embodiments may be carried out without departing from the principles of the present invention, which is intended to be limited only by the scope of the appended claims as interpreted according to the principles of patent law including the doctrine of equivalents.

The invention claimed is:

1. An apparatus for classifying particulate material comprising:
    first and second tanks for receiving a feed slurry, the first and second tanks having respective lower regions;
    a device for introducing water into the respective lower regions of the first and second tanks, whereby water is caused to flow upwardly and through the feed slurry contained in each of the first and second tanks;
    a device for introducing feed slurry in an upwards direction into each of the first and second tanks, wherein the device for introducing feed slurry comprises a transfer passage for transferring material from the lower region of the first tank to the second tank, and wherein the transfer passage has an outlet region extending upwardly within the second tank and an upwardly-facing outlet portion opening into the second tank; and
    first and second devices for effecting discharge of an overflow fraction from respective ones of the first and second tanks, whereby hydraulic separation takes place within the first and second tanks with particles of lower settling velocity progressing upwardly and into the respective first and second devices for effecting discharge, and particles of greater settling velocity progressing downwardly to the respective lower regions of the first and second tanks, and wherein the feed slurry is introduced into the first and second tanks in an upwards direction.

2. The apparatus of claim 1, wherein the device for introducing water into the first and second tanks is adapted to create a pressure differential between the ends of the transfer passage to cause the feed slurry to flow through the transfer passage from the first tank to the second tank.

3. The apparatus claim 1, wherein at least one further tank and at least one further device for introducing feed slurry are provided downstream of the second tank, the at least one further device for introducing feed slurry comprising at least one further transfer passage extending from a lower region of an adjacent tank into the at least one further tank, wherein an outlet region of the at least one further transfer passage extends upwardly such that feed slurry enters the at least one further tank in an upwards direction.

4. The apparatus claim 1, wherein the second tank is arranged coaxially within the first tank.

5. The apparatus of claim 4, wherein a lower end of the second tank extends below a lower end of the first tank.

6. The apparatus of claim 4, wherein the outlet portion of the transfer passage is substantially aligned with a central axis of the second tank or, where there two or more than transfer passages, wherein outlet portions of the transfer passages are equally spaced around the central axis of the second tank.

7. The apparatus of claim 4, wherein a peripheral upper edge of first tank defines an outlet weir, wherein the overflow fraction of the first tank passes into an annular collection area surrounding an upper region of the first tank.

8. The apparatus of claim 7, wherein the collection area is provided with a drain outlet.

9. The apparatus claim 1, wherein the transfer passage is arranged to introduce the feed slurry into the second tank at a predetermined flow rate.

10. The apparatus of claim 9, wherein a control device is provided for controlling the flow rate through the transfer passage.

11. The apparatus claim 1, wherein the second tank is provided with at least one outlet in the lower region thereof for withdrawing an underflow fraction from the lower region.

12. The apparatus of claim 11, wherein a control device is provided for controlling the flow rate of the underflow fraction through the outlet.

13. The apparatus claim 1, wherein a peripheral upper edge of the second tank defines an outlet weir, wherein the overflow fraction of the second tank passes into an annular collection area surrounding an upper region of the second tank.

14. The apparatus of claim 13, wherein the annular collection area of the second tank is provided with a drain outlet.

15. The apparatus of claim 14, wherein the second tank is located within the first tank and the drain outlet of the second tank passes through the first tank.

16. The apparatus claim 1, wherein the device for introducing water into the first and second tanks comprises a first supply device for delivering water to one or more outlets in the lower region of the first tank and a second supply device for delivering water to one or more outlets in the lower region of the second tank, the first and second supply devices being independently controllable to independently vary the flow rate of water delivered to each of the first and second tanks from the respective outlets.

17. The apparatus of claim 16, wherein the first supply device comprises a first pump and the second supply device comprises a second pump.

18. The apparatus of claim 1, wherein the device for introducing water into the lower regions of the first and second tanks comprises one or more downwardly facing discharge pipes.

* * * * *